United States Patent [19]

Schrape et al.

[11] Patent Number: 4,581,950
[45] Date of Patent: Apr. 15, 1986

[54] GEAR CHANGING DEVICE

[75] Inventors: Peter Schrape, Stuttgart; Günter Wörner, Kernen; Werner Walter, Eislingen, all of Fed. Rep. of Germany

[73] Assignee: Daimler-Benz Aktiengesellschaft, Fed. Rep. of Germany

[21] Appl. No.: 528,121

[22] Filed: Aug. 31, 1983

[30] Foreign Application Priority Data

Sep. 10, 1982 [DE] Fed. Rep. of Germany ....... 3233619

[51] Int. Cl.$^4$ ............................................ F16H 57/10
[52] U.S. Cl. .................. 74/411.5; 74/337.5; 74/339; 74/473 R; 192/4 C
[58] Field of Search ............ 192/4 C; 74/337.5, 339, 74/411.5, 473 R

[56] References Cited

U.S. PATENT DOCUMENTS

| 3,536,230 | 10/1970 | Williams | 74/411.5 |
|---|---|---|---|
| 3,677,104 | 7/1972 | Hirozawa et al. | 74/337.5 |
| 4,252,223 | 2/1981 | Morscheck | 74/339 |
| 4,265,137 | 5/1981 | Johannesson et al. | 74/473 R |
| 4,288,693 | 10/1980 | Kelbal | 74/339 |
| 4,294,338 | 10/1981 | Simmons | 192/4 A |
| 4,332,312 | 6/1982 | Sabel et al. | 192/4 C |
| 4,337,675 | 7/1982 | Holdeman | 74/337.5 |

FOREIGN PATENT DOCUMENTS

| 2319396 | 1/1976 | Fed. Rep. of Germany. |
|---|---|---|
| 2319397 | 2/1976 | Fed. Rep. of Germany. |
| 2506570 | 10/1977 | Fed. Rep. of Germany. |
| 2603339 | 9/1979 | Fed. Rep. of Germany. |
| 3048770 | 12/1980 | Fed. Rep. of Germany. |
| 2392288 | 5/1978 | France. |
| 2067250 | 7/1981 | United Kingdom. |
| 2088972 | 6/1982 | United Kingdom. |

Primary Examiner—Ronald C. Capossela
Attorney, Agent, or Firm—Barnes & Thornburg

[57] ABSTRACT

A mechanical selector device for a gear changing gearbox of a motor vehicle with a non-synchronized reverse gear has an axially displaceable idler gear, which is connected by means of a selector unit with a selector sliding sleeve, by means of whose axial displacement first a synchronizer clutch and subsequently a positive drive gear clutch of a forward gear can be operated. In order to facilitate the engagement of the idler gear when the gearbox driven shaft and the rotating layshaft are stationary, the selector sliding sleeve is connected with a slotted lever having a slot and being pivotable about a bearing axis fixed in location with respect to the gearbox casing and the selector unit is connected to a slot follower constrained to travel in the slot and having a movement path fixed with respect to the spatial axes of the gearbox casing—or vice versa. The slot has two neutral sections, each of which has a shape conforming to the movement path and an intermediate engagement section with a shape deviating from the movement path in such a way that when the reverse gear is selected, the slot follower passes from one neutral section into the other neutral section, passing through the engagement section, and thus operates exclusively the synchronizer clutch, bringing this into frictional connection over only a limited section of the engagement path.

9 Claims, 7 Drawing Figures

GEAR CHANGING DEVICE

BACKGROUND AND SUMMARY OF THE INVENTION

The invention relates to a mechanical selector device for a gear changing gearbox of a motor vehicle. The invention relates more specifically to an improved selector device for controlling sequential engagement of a synchronizer clutch and a positive drive gear clutch during certain gear shift changes. The invention is especially adapted for use in gearbox systems of the type having a non-sychronized reverse gear and an axially displaceable idler gear, which is connected by means of a selector unit with a selector sliding sleeve, which sliding sleeve effects the sequential engagement of the synchronizer and drive gear clutches.

In a known selector device of this general type German Patent No. 2,603,339), the selector sliding sleeve is operated by the usual selector fork, which is connected so that it moves with an axially displaceable selector rod leading to the idler gear, which selector rod is operated by a selector finger which can, if desired, be connected to a manual gear lever. So that in the case of the reverse gear the idler gear does not have to make an ineffective movement in accompanying the axial displacement of the selector sliding sleeve necessary to engage a forward gear, the idler gear is connected to a slotted selector lever, which is pivotable about a bearing axis locationally fixed relative to the gearbox casing, which slotted selector lever has a selector slot in which a slot follower, which is connected so as to move with the selector rod, is forced to travel. The selector slot has a neutral section with a shape parallel to the axis of the selector rod—i.e., in conformity with the path of movement of the slot follower—and an adjoining selector section with a shape normal to the axis13 i.e., deviating from the path of movement. Difficulties occur with this arrangement when selecting the reverse gear because the idler gear must be brought into engagement both with a gear wheel associated with the particular gear and rotationally solidly connected to a gearbox driven shaft, which in this case is at rest, and with a gear wheel, associated with the particular gear and rotationally solidly connected to a rotating layshaft.

In order to overcome these difficulties, it has been contemplated, in the case of selector devices not of the type under consideration, in which the idler gear of the reverse gear is not connected for gear changing technical purposes to a selector sliding sleeve of a forward gear, to operate a frictionally connected synchronizer clutch of a forward gear in order to brake the layshaft over a limited part of the selection path when engaging the reverse gear. In the selector devices of German Patents No. 2,319,396 and 2,319,397, which are not of the type considered here, this takes place by means of an auxiliary cam which, at least with respect to the selection movements, is located so that it is fixed in position relative to a selector finger, which can be brought into engagement with the individual selector forks in order to operate the selector sliding sleeves and operate a selector fork of a forward gear and thus the associated synchronizer clutch during its movement from the neighboring gate position of two forward gears to the gate position of the reverse gear. In contrast, in the selector device of German Patent No. 2,506,570, which is not of the type under consideration, a first selector finger of a selector shaft is brought into engagement with a selector rod connected to the idler gear of the reverse gear, when selecting the gate position of the reverse gear, and a second selector finger of the selector shaft is brought into engagement with an auxiliary selector rod. When selecting the reverse gear, the auxiliary selector rod operates a synchronizer clutch of a forward gear.

An object of the invention consists substantially in so arranging a selector device in a gearbox system of the type mentioned above, that when selecting the reverse gear a braking action on the gearbox driving shaft ad layshaft is also obtained. This object is achieved in an advantageous manner according to the invention by providing an arrangement wherein the selector sliding sleeve is connected to a firsxt slotted selector lever pivotable about a bearing axis with fixed location relative to a gearbox casing, wherein the selector unit is connected to a first slot follower guided in a first guide slot of the first slotted selector lever and having a movement path fixed reltive to the spatial axes of the gearbox casing, the first guide slot having two neutral sections and an intermediate engagement section, wherein, in a neutral initial position of the selector unit—in which forward and reverse gears are disengaged—the neutral sections lie within and the engagement section lies outside the movement path, in such a way that when the reverse gear is selected, the first slot follower moves from one neutral section into the other neutral section, passing through the engagement section, and thus operates the synchronizer clutch exclusively and only over a limited section of the engagement path of the selector unit.

In preferred emobdiments of the invention, the idler gear is connected to a second slotted selector lever pivotable about a bearing axis fixed in location with respect to the gearbox casing and having a second guide slot, wherein the selector unit is connected to a second slot follower guided in the second slot and having a movement path fixed with respect to the spatial axes of the gearbox casing, the second slot having a neutral section and an adjoining selector section and in which, in a neutral initial position of the selector unit—in which forward and reverse gears are disengaged—the neutral section lies within and the selector section lies outside the movement path in such a way that the second slot follower is located in the area of the neutral section on selection of the forward gear and enters the selector section on selection of the reverse gear and thus displaces the idler gear, and wherein, by mutual matching of the first and second slots, the second slot follower working in conjunction with the idler gear is still located in its neutral section belonging to the initial position as long as the first slot follower, operating in conjunction with the selector sliding sleeve, is located in its appropriate engagement section.

In order to prevent undesired engagement of the synchronizing clutch during disengagement from the reverse gear, certain preferred embodiments include a spring biased clutch member mounted at the first slotted selector lever.

Further objects, features, and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
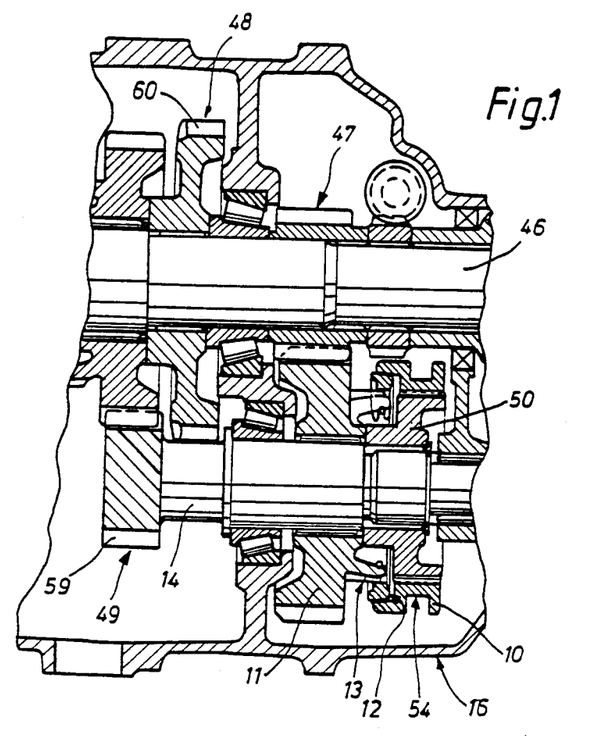
FIG. 1 is a partial schematic sectional view depicting the driven end of a gear change gearbox in a partial section in a plane containing the rotational axes of a gearbox driven shaft and a layshaft, configured for use in connection with the selector device of the present invention.
Figure 2:
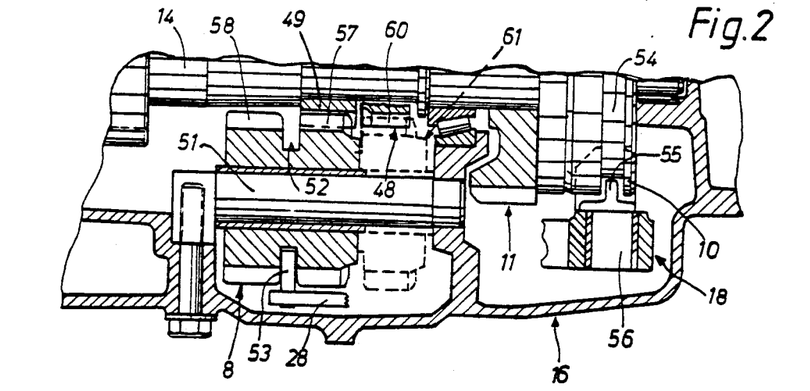
FIG. 2 is a partial schematic sectional view of the end of the gear change gearbox corresponding to FIG. 1 in a partial section in a plane containing the rotational axis of a layshaft.

Referring to FIGS. 1 and 2, a layshaft 14 and a gearbox driven shaft 46 are supported rotatively in a gearbox casing 16. A gear wheel 47 for the fifth gear and a gear wheel 48 for the reverse gear are rotationally solidly located on the gearbox driven shaft 46. A gear wheel 49 for the first gear and a hub 50 are located centrally and rotationally solidly fixed with respect to the layshaft 14, between which two gear wheels a gear wheel 11 for the fifth gear, which engages with the gear wheel 47, is supported so that it can rotate on the layshaft 14.

The hub 50 carries a selector sliding sleeve 10, which is rotationally solidly fixed but displaceable axially relative to it, in order to connect the gear wheel 11 to the layshaft 14. For this purpose, the selector sliding sleeve 10 and gear wheel 11 have, on the end surfaces facing one another, conical friction surfaces for a synchronizer clutch 12 and claw teeth for a gear clutch 13, which clutches are operated in series by axial displacement of the selector sliding sleeve 10 in the direction of the gear wheel 11.

Not shown in the drawing is the gearbox driving shaft, which is supported so as to rotate coaxially with the gearbox driven shaft 46 in the gearbox casing 16, which driving shaft can be connected in conventional manner by means of a clutch to the driving engine of the motor vehicle and is in permanent driving connection with the layshaft 14 through a constant gear ratio.

In addition, a short intermediate shaft 51 is supported in the gearbox casing 16 with its axis parallel to the layshaft 14 and substantially fixed in position, on which intermediate shaft 15 an idler gear 8 for the reverse gear is guided so that it can rotate and be displaced axially. In the axially central area, the idler gear 8 is provided with a peripheral groove 52, in which a selector pin 53 engages, which selector pin 53 sits positively located at one end of a slotted selector lever 28.

The selector sliding sleeve 10 is also provided with a peripheral groove 54 in which a selector fork 55 engages, which selector fork 55 has a fork neck 56 positively connected to it, which fork neck 56 is inserted so that it can rotate in the central section of a further slotted selector lever 18.

The idler gear 8 has two sets of teeth 57 and 58 on either side of the peripheral groove 52, of which the teeth 57—if, as is shown in FIGS. 1 to 4, the selector device is in its neutral initial position 19, in which the reverse gear and the fifth gear are disengaged—engage in the teeth 59 of the gear wheel 49 for the first gear. If the idler gear 8, after its axial displacement, is in its position 61, shown dotted in FIG. 2, for the reverse gear, its teeth 57 are now in engagement with the teeth 60 of the gear wheel 48, while its previously disengaged teeth 58 are now in engagement with the teeth 59 of the gear wheel 49.

When selecting reverse gear, the motor vehicle is normally at rest, so that the gearbox driven shaft 46 and its gear wheel 48 for the reverse gear are more or less solidly braked. On the other hand, the layshaft 14 and with it the idler gear 8 continue to rotate even after the disengagement of the clutch for separating the gearbox driving shaft from the driving engine. In order, when selecting the reverse gear, to brake the idler gear 8 solidly before engagement in the teeth 60 of the stationary gear wheel 48, the synchronizer clutch 12 of the fifth gear is temporarily activated because the associated gear wheel 11, in consequence of its continuous tooth engagement with the gear wheel 47 (rotationally solidly connected to the gearbox driven shaft 46), is solidly braked and thus a braking effect is produced on the layshaft 14 by means of the frictional connection of the synchronizer clutch 12.

For this purpose, the slotted selector lever 18, which is connected to the selector sliding sleeve 10 in the manner described above, has a slot 15 with an engagement section 27, an engagement section in the form of a special clutch cam 36 being used in the case of the embodiment form of FIGS. 4 to 7.

Figure 3:
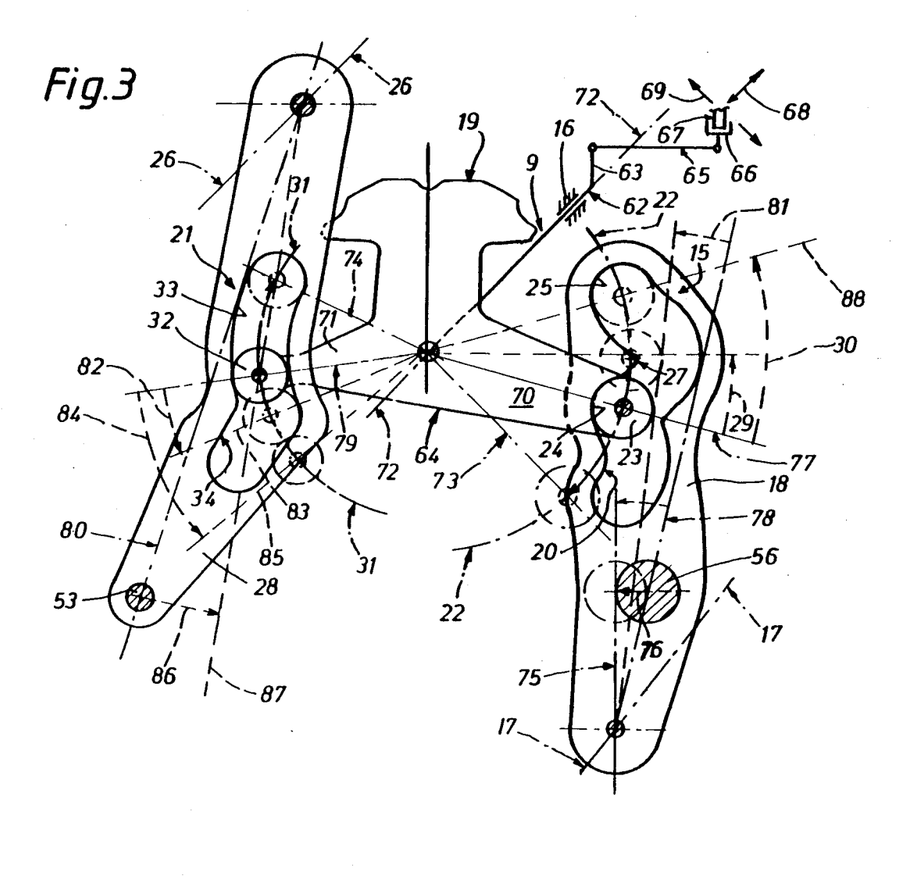
FIG. 3 is a perspective schematic view of a selector device constructed according to a first embodiment of the invention, for controlling engagement of the fifth gear and the reverse gear of the gear change gearbox of FIGS. 1 and 2, shown in a neutral initial position.

In both embodiment forms (FIG. 3 and FIGS. 4 through 7), a common selector unit 9 is used for selecting the fifth gear and the reverse gear, which selector unit 9—as already explained—is connected kinematically by means of the slotted selector lever 18 to the selector sliding sleeve 10 and by the slotted selector lever 28 to the idler gear 8. The function of the selector unit 9 is indicated schematically in FIG. 3, as follows:

a short selector shaft 62, rotatively mounted in an external wall of the gearbox casing 16 transverse to the gearbox shafts 14 and 51, is connected (in each case rotationally solidly) to an external selector lever 63 at its shaft end external to the casing and to an internal double selector lever 64 at its shaft end internal to the casing. The external selector lever 63 is connected by means of a selector rod 65 to a selector fork 66, which can be operated by means of a selector finger 67, connected directly or indirectly to a manual selector lever, along a selector gate position 61 for the fifth gear and for the reverse gear. In the shown neutral initial position 19 of the selector unit 9, the selector finger 67 can be moved in a selector plane 68 from another selector gate position (not shown) of the other forward gears into the selector gate position 69 and brought into engagement with the selector fork 66. One of the two gears can, however, also be operated by means of a special auxiliary selector finger connected to the manual selector lever, in order to allocate the two gears to two different selector gate positions in the gear selection diagram on the manual selector lever—which, for example, lie on either side of a normal H gear selection diagram.

One lever arm 70 of the double selector lever 64 has, at its free end—for example in the form of a rotatably retained roller—a slot follower 23, which is constrained to travel in the slot 15 of the slotted selector lever 18. In a corresponding way, the other lever arm 71 of the double selector lever 64 has a slot follower 32, which is constrained to travel in a slot 21 of the other slotted selector lever 28. The slot followers 23 and 32 have each a path of movement 22 and 31, respectively, centered on the bearing axis 72—72 of the double selector lever 64. The slotted selector levers 18 and 28 are rotatably supported about a bearing axis 17—17 or 26—26, respectively, parallel to the bearing axis 72—72 and fixed in location relative to the gearbox casing 16.

In the initial position 19 of the selector unit 9 (FIGS. 3 and 4), the slot followers 23 and 32 are each located in a neutral section 24 or 33, respectively, of their slots 15 and 21, respectively. By this means, the selector sliding sleeve 10 and the idler gear 8 are each fixed by means of the associated slotted selector levers 18 or 28, respectively, in their neutral initial positions shown in FIGS. 1 and 2.

Following the previously mentioned neutral sections 24 and 33 of the two slots 15 and 21, there is, in each case, a selector section 20 and 34, respectively, in mutually opposing peripheral directions with reference to the bearing axis 72—72. These selector sections 20 and 34 are located, in the initial position 19 of the selector unit 9, outside the paths of movement 22 and 31, respectively, of the associated slot followers 23 and 32. In this manner, when the fifth gear is selected by operation of the double selection lever 64 in the clockwise direction (with reference to the representation in the drawing), the slot follower 23 moves out of its initial position 77 shown into its gear position, shown chain-dotted at 73, with displacement (selector path 76) of the slotted selector lever 18 from its initial position 78 shown into its gear position, shown chain-dotted at 75. During this process, the other slot follower 32 moves within the neutral section 33 out of its initial position 79 shown into a neutral position, shown chain-dotted at 74, without bringing the slotted selector lever 28 out of its shown initial position 80 in the process. The selection path 76 followed by the fork neck 56 to arrive at the gear position 75 is sufficiently large so that the conical surfaces of the synchronizer clutch 12 are first brought into frictional connection and the gear clutch 13 is subsequently engaged.

At its other end, the selection slot 15 has another neutral section 25 which, in the initial position 19 of the selector unit 9, again falls within the path of movement 22 of the slot follower 23. The engagement section 27 of the selection slot 15 connecting the two neutral sections 24 and 25 is located (in the initial position 19 of the selector unit 9) by such an amount outside the path of movement 22 that when selecting the reverse gear—i.e., when operating the double selection lever 64 in the counterclockwise direction as seen in the drawings—the fork neck 56 is deflected at the most by a part section 81 of the selection path 76 in the direction of the gear wheel 11 when the slot follower 23 is passing through the engagement section 27. By means of a displacement of the selector sliding sleeve 10 corresponding to the part section 81, the synchronizer clutch 12 is activated, the gear clutch 13 remaining unoperated in the process.

The shape of the engagement section 27 relative to the path of movement 22 is initially so designed that the activation of the synchronizer clutch 12 has already ended after a part section 29 of the selection path 30 of the double selector lever 64. The neutral section 33 of the slot 21 is now so designed over its effective length that the slot follower 32 still passes through a non-operative part 82 without displacing the slotted selector lever 28, while the slot follower 23 passes along the part section 29. Only after conclusion of synchronization (braking to a standstill) does the slot follower 32—approximately from a position shown dotted at 83—enter the selector section 34, if the selector unit 9 is further operated over its complete selection path 84, at whose end the slot follower 32 takes up a gear position (shown dotted at 85) in which the slotted selector lever 28 is forced to move into its gear position 87 (also shown dotted) via the selection path 86. In the said gear position 85 of the slot follower 32, the other slot follower 23 is now fully located in a neutral position 88 in the associated neutral section 25 of its slot 15, in which neutral position 88 the slotted selector lever 18 is brought back into its initial position 78 shown.

In order to avoid the synchronizer clutch 12 also being briefly activated on disengaging the reverse gear, in the second embodiment of FIGS. 4 to 7 the clutch cam 36 is used initially instead of a single-part limitation of the engagement section 27 on the slotted selector lever 18 in one peripheral direction of the pivoting bearing axis 17—17, which selector cam 36 is held on the slotted selector lever 18 by means of a single axis link 45. In addition, in the second embodiment form, the two neutral sections 24 and 25 of the slot 15 are connected to one another by means of a neutral gear section 35, which can be opened to the engagement section 27. The engagement cam 36 is held by means of a bow spring 37 against the slot 15 in a clutch position 38 shown in FIGS. 4, 5, and 7, which clutch position 38 is determined by an end stop 42 on the clutch cam 36 and a corresponding opposing end stop 43 on the slotted selector lever 18.

With regard to the remaining features, both embodiment forms agree with one another so that the corresponding reference numbers of FIGS. 1 to 3 are also repeated in FIGS. 4 to 7, and reference should be made to the appropriate description of the first embodiment form of FIG. 3 for their significance.

Figure 4:
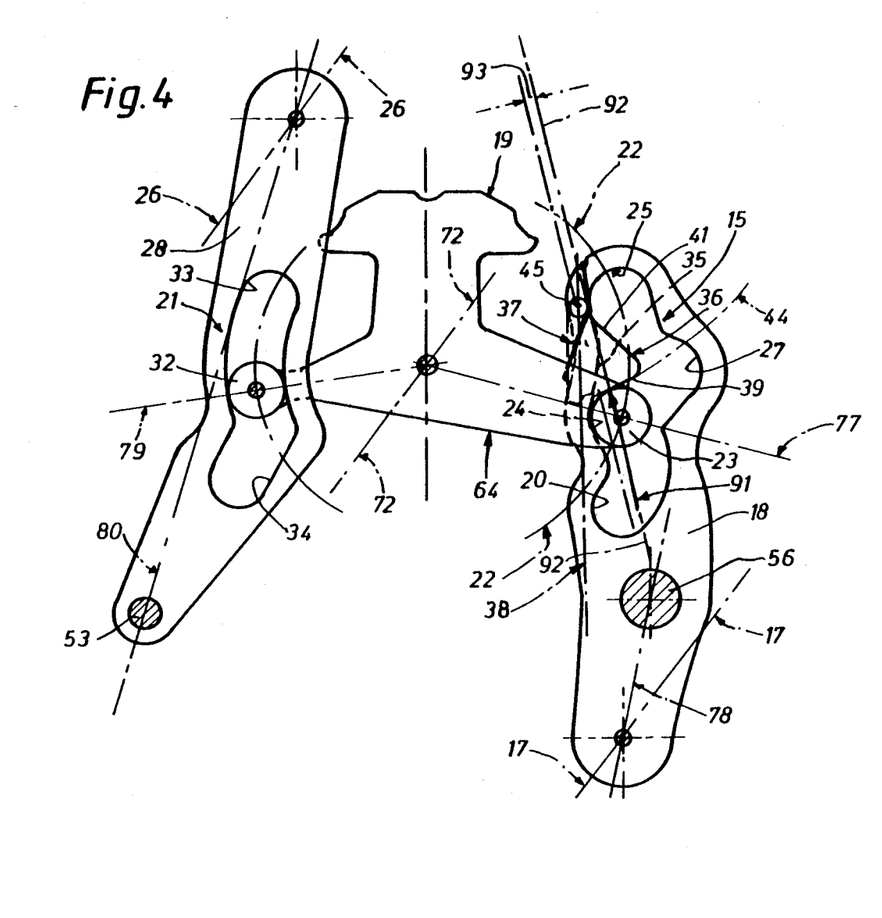
FIG. 4 is a perspective schematic view of a selector device constructed according to a second embodiment of the invention, for controlling engagement of the fifth gear and the reverse gear of the gear change gearbox of FIGS. 1 and ,2, shown in a neutral initial position.

In FIG. 4, the inner double selector lever 64 is located in its initial position 19, in which its two slot followers 23 and 32 are in their initial positions 77 and 79, respectively, in the associated neutral sections 24 and 33, respectively. Consequently, the two slotted selector levers 18 and 28 are in their initial positions 78 and 80, reverse gear and fifth gear being disengaged, as is described with respect to FIGS. 1 to 3.

In its initial position 77, the slot follower 23 is in contact with a cam surface 39 of the clutch cam 6, whose path 44 relative to the cam path 22 and the link 45 is so chosen that when the double selector lever 64 is operated in a counterclockwise direction with respect to the bearing axis 72—72 in order to select the reverse gear, the resulting selection force 91 on the clutch cam 36, taking account of the friction, lies in a plane 92—92, which either contains the axis of the link 45 (dead point position) or has a relatively small distance 93 from this axis, such that a retaining moment occurs at the clutch cam 36, which moment supports the contact of the end stop 42 with the opposing end stop 43—i.e., the spring force of the bow spring 37. In this manner, the slot follower 23 is prevented by the cam surface 39 from entering the neutral gear section 35 from the neutral position 24 and is forced to enter the selector section 27, as is shown in FIG. 5.

Figure 5:
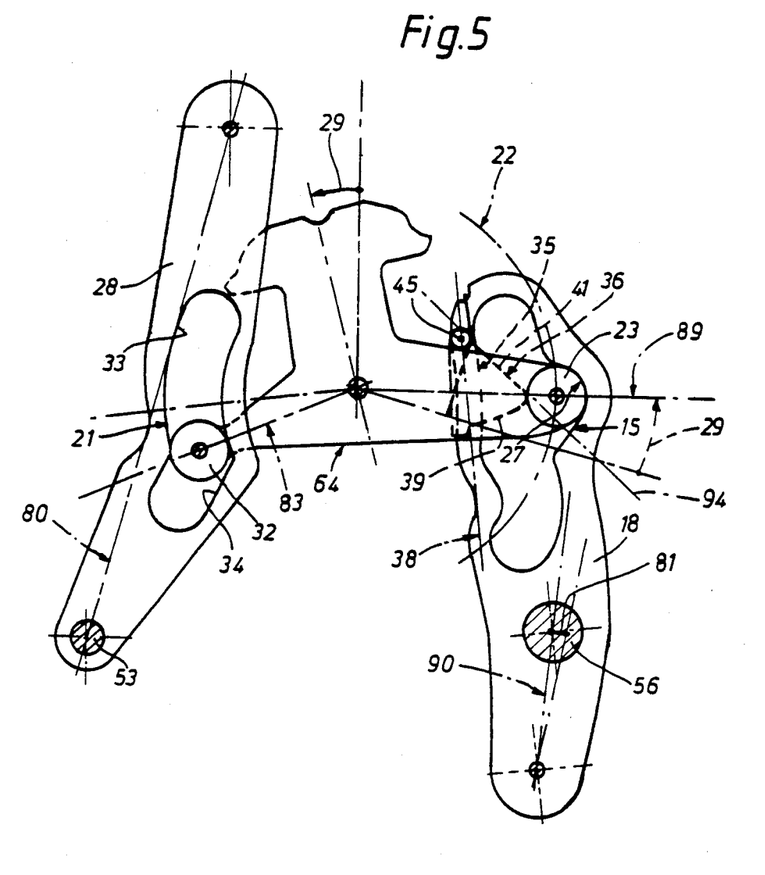
FIGS. 5 to 7 depict the selector device of FIG. 4, in respective positions deviating from the initial neutral position of FIG. 4.
Figure 6:
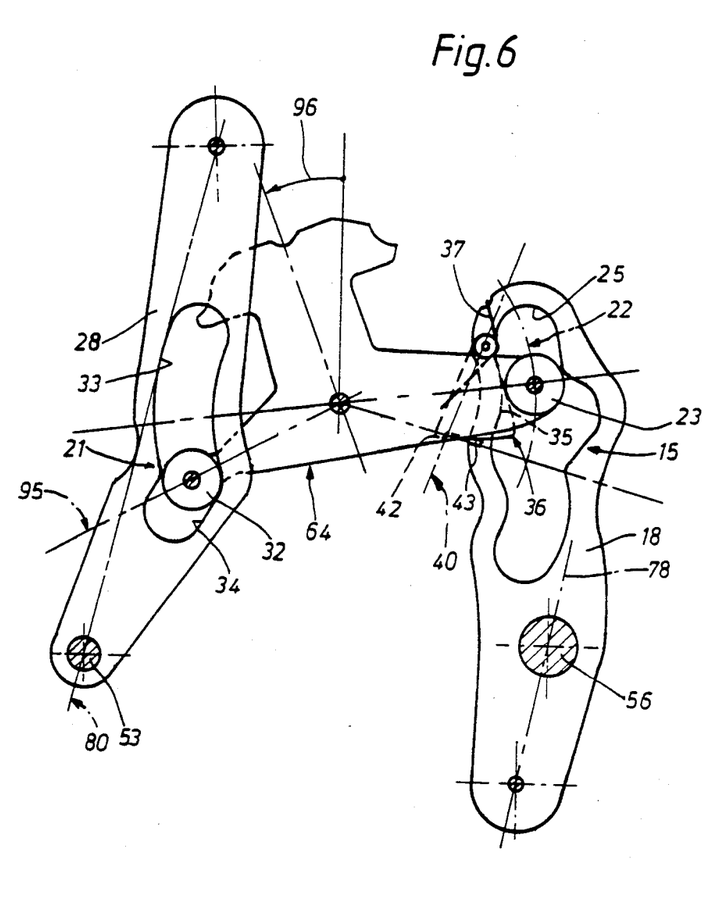

In FIG. 5, the double selector lever 64 with its slot followers 23 and 32 has been moved by the partial section 29 of the selector path to engage the reverse gear, in order to activate the synchronizer clutch 12 (synchronizing position 90 of the selector sliding sleeve and selector fork neck 56). In this phase, the slot follower 23 is located at the transition from the cam surface 39 to a further cam surface 41 on the clutch cam 36. The movement 94 of this relative to the link 45 and to the path of movement 22 is so designed that by means of a further operation of the double selector lever 64 to engage the reverse gear, the slot follower 23 moves beyond its synchronizing position 89 and comes into engagement with the cam surface 41 and the clutch cam 36 is, by this means, forced back into a neutral gear position 40 against the spring force 37, in which the slot follower 23 can enter the neutral gear section 35 and by means of which the slotted selector lever 18 can return from its synchronizing position 90 (FIG. 5) into the initial position 78 (FIG. 6). In the synchronizing position 90, the slotted selector lever 18 has displaced the selector sliding sleeve 10 by the part section 81 of the selector path to activate alone the synchronizing clutch 12.

On entry of the slot follower 23 into the neutral gear section 35, in accordance with FIG. 6, the double selector lever 64 has executed that part section 96 of its selection path, in which the other slot follower 32 has arrived in a position 95, which is still located in the end region of the neutral section 33 of the slot 21, so that the slotted selector lever 28 together with the selector pin 53 can still remain in the initial position 80 during the execution of the part section 96.

Figure 7:
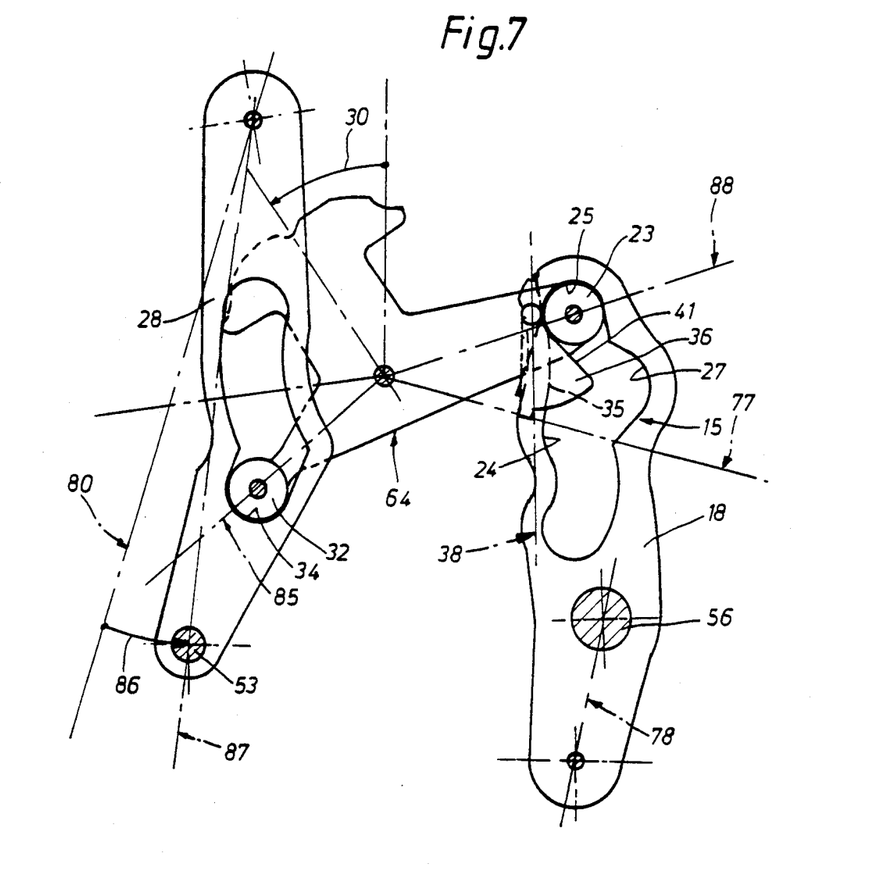

Finally, in the representation of FIG. 7, the double selector lever 64 has executed its complete selection path 30 to engage reverse gear, so that slot follower 32 and selector pin 53 are located in the associated gear positions 85 and 87, respectively—on the other hand, the slot follower 23 is in its neutral position 88 and the fork neck 56 is in its initial position 78.

In the neutral position 88 of the slot follower 23, the selector cam 36 is, in fact, sprung back into its engagement position 38. On disengaging the reverse gear, however—when the double selector lever 64 is operated in the clockwise direction—the slot follower 23 passes the clutch cam 36 back again into the neutral gear position 40 shown in FIG. 6 by means of its cam surface 41. By this means, the slot follower 23 can move along the neutral gear section 35 into the neutral section 34 associated with its initial position 27—without having to enter the engagement section 27. The slotted selector lever 18 thus remains in its initial position 78 when the reverse gear is disengaged—consequently, activation of the synchronizer clutch 12 does not occur.

While we have shown and described several embodiments in accordance with the present invention, it is understood that the same are not limited thereto but are susceptible to numerous changes and modifications as would be known to those skilled in the art of the present disclosure and we therefore do not wish to be limited to the details shown and described therein but intend to cover all such changes and modifications as are encompassed by the scope of the appended claims.

What is claimed is:

1. Mechanical selector device for a gear changing gearbox of a motor vehicle, in which an axially displaceable idler gear is used for selecting a non-synchronized reverse gear, which idler gear is connected by means of a selector unit to a selector sliding sleeve, said selector sliding sleeve being axially displaceable to connect a gear wheel of a particular gear of a forward gear to its shaft by means of an initially occurring frictional connection of a synchronizer clutch and subsequent engagement of a positive drive gear clutch, wherein the selector sliding sleeve is connected to a first slotted selector lever pivotable about a bearing axis with fixed location relative to a gearbox casing, wherein the selector unit is connected to a first slot follower guided in a first guide slot of the first slotted selector lever and having a movement path fixed relative to the spatial axes of the gearbox casing, the first guide slot having two neutral sections and an intermediate engagement section, wherein, in a neutral initial position of the selector unit—in which forward and reverse gears are disengaged—the neutral sections lie within and the engagement section lies outside the movement path, in such a way that when the reverse gear is selected, the first slot follower moves from one neutral section into the other neutral section, passing through the engagement section, and thus operates the synchronizer clutch exculsively and only over a limited section of the engagement path of the selector unit;

wherein the two neutral sections of the first slot, connected in effect to the selector sliding sleeve, are connected to one another by a neutral gear section, which neutral gear section is located in the initial position of the selector unit in the movement path of the associated first slot follower, wherein a clutch cam, supported on the first slotted selector lever, is held by spring force against the first slot in a clutch position, in which clutch position the first slot follower is prevented by one cam surface from entering the neutral gear section of the neutral section belonging to the initial position, and wherein the clutch cam has a further cam surface for its displacement into a neutral gear position which frees the neutral gear section for the first slot follower, with which further cam surface the first slot follower is in engagement on its return movement from the neutral section, belonging to the reverse gear, into the neutral section, belonging to the initial position.

2. Selector device according to claim 1, wherein the first guide slot has a selector section emerging from the neutral section, belonging to the initial position, in the direction opposite to the engagement section, which selector section lies outside the movement path in the initial position of the selector unit in such a way that, when selecting the forward gear, the first slot follower enters the selector section and thus sequentially operates the synchronizer clutch and the gear clutch.

3. Selector device according to claim 2, in which the idler gear is connected to a second soltted selector lever pivotable about a bearing axis fixed in location with respect to the gearbox casing and having a second guide slot, wherein the selector unit is connected to a second slot follower guided in the second slot and having a movement path fixed with respect to the spatial axes of the gearbox casing, the second slot having a neutral section and an adjoining selector section and in which, in a neutral initial position of the selector unit—in which forward and reverse gears are disengaged—the neutral section lies within and the selector section lies outside the movement path in such a way that the second slot follower is located in the area of the neutral section on selection of the forward gear and enters the selector section on selection of the reverse gears and thus displaces the idler gear, and wherein, by mutual matching of the first and second slots, the second slot follower working in conjunction with the idler gear is still located in its neutral section belonging to the initial position as long as the first slot follower, operating in conjunction with the selector sliding sleeve, is located in its appropriate engagement section.

4. Selector device according to claim 1, in which the idler gear is connected to a second slotted selector lever pivotable about a bearing axis fixed in location with respect to the gearbox casing and having a second guide slot, wherein the selector unit is connected to a second slot follower guided in the second slot and having a movement path fixed with respect to the spatial axes of the gearbox casing, the second slot having a neutral section and an adjoining selector section and in which, in a neutral initial position of the selector unit—in which forward and reverse gears are disengaged—the neutral section lies within and the selector section lies outside the movement path in such a way that the second slot follower is located in the area of the neutral section on selection of the forward gear and enters the selector section on selection of the reverse gear and thus displaces the idler gear, and wherein, by mutual matching of the first and seconds slots, the second slot follower working in conjunction with the idler gear is still located in its neutral section belonging to the initial position as long as the first slot follower, operating in conjunction with the selector sliding sleeve, is located in its appropriate engagement section.

5. Selector device according to claim 1, wherein the clutch position is fixed by an end stop and opposing end stop means of the clutch cam and the first slotted selector lever.

6. Selector device according to claim 5, wherein the path of the cam surface preventing entry into the neutral gear section is so matched to the movement path of the first slot follower and the support of the clutch cam that a retaining moment supporting the opposing positions of the end stop and opposing end stop means occurs at the clutch cam in its clutch position on engagement of the first slot follower.

7. Selector device according to claim 6, wherein the clutch section and the neutral gear section are open to one another.

8. Selector device according to claim 7, wherein the clutch cam is supported by a link pivotably on the first slotted selector lever.

9. Selector device according to claim 8, wherein a bow spring is used for the spring force against the clutch cam.

* * * * *

UNITED STATES PATENT AND TRADEMARK OFFICE
CERTIFICATE OF CORRECTION

PATENT NO. : 4,581,950
DATED : Apr. 15, 1986
INVENTOR(S) : Schrape et al.

It is certified that error appears in the above-identified patent and that said Letters Patent is hereby corrected as shown below:

Column 1, line 37, delete "13" and insert -- - --.

Column 2, line 11, delete "ad" and insert -- and --.

Column 2, line 15, delete "firsxt" and insert -- first --.

Column 2, line 34, delete "emobdiments" and insert -- -- embodiments --.

Column 3, line 60, delete "15" and insert -- 51 --.

Column 6, line 57, delete "6" and insert -- 36 --.

Column 8, line 58, delete "2" and insert -- 1 --.

Column 9, line 5, delete "gears" and insert -- gear --.

Column 9, line 13, delete "1" and insert -- 2 --

Signed and Sealed this

Nineteenth Day of August 1986

[SEAL]

Attest:

DONALD J. QUIGG

Attesting Officer   Commissioner of Patents and Trademarks